United States Patent [19]

Schipper

[11] Patent Number: 4,671,876
[45] Date of Patent: Jun. 9, 1987

[54] BELT FILTER DEVICE WITH PIVOTAL SUCTION CASING

[75] Inventor: Hendricus H. Schipper, Bunnik, Netherlands

[73] Assignee: B.V. Machinefabriek v/h Pannevis & Zn., Utrecht, Netherlands

[21] Appl. No.: 752,158

[22] Filed: Jul. 3, 1985

[30] Foreign Application Priority Data

Jul. 12, 1984 [EP] European Pat. Off. ........ 84201032.4

[51] Int. Cl.⁴ ............................................. B01D 33/04
[52] U.S. Cl. .................................... 210/400; 210/406; 162/272; 162/364
[58] Field of Search ............... 210/406, 401, 400, 344; 162/272, 351, 363, 364, 374

[56] References Cited

U.S. PATENT DOCUMENTS

| | | | |
|---|---|---|---|
| 2,377,252 | 5/1945 | Lehrecke | 210/401 |
| 3,940,308 | 2/1976 | Blanchfield | 162/363 |
| 4,011,131 | 3/1977 | Nicholson | 162/374 |
| 4,080,298 | 3/1978 | Nordengren | 210/400 |
| 4,265,765 | 5/1981 | Gallottini | 210/401 |
| 4,338,193 | 7/1982 | Lautrette et al. | 210/401 |
| 4,595,501 | 6/1986 | Queyroix | 210/400 |

FOREIGN PATENT DOCUMENTS 2509057  9/1976  Fed. Rep. of Germany ...... 162/364
2900774  7/1979  Fed. Rep. of Germany ...... 210/400

Primary Examiner—Richard V. Fisher
Assistant Examiner—Linda S. Evans
Attorney, Agent, or Firm—Schmidt, Johnson, Hovey & Williams

[57] ABSTRACT

A belt filter device mounted on a frame carrying an endless conveyor belt has a casing arranged below an upper run of the belt, and application of subatmospheric pressure to interior regions of the casing causes liquid to be withdrawn from material lying on the conveyor belt through drainage holes provided in the belt. The casing is pivotal with respect to the frame between a first, operational position and a second, cleaning position, and a separating means shifts the casing away from a cover or support means simultaneously with movement of the casing from its operational position toward its position for cleaning. The cover carries a pair of spaced wear strips for support of the belt portion above an open top of the casing, to enable the dimensions of the open casing top to be substantially larger than the gap between the wear strips to facilitate ready access into interior regions of the casing when the latter is in its position for cleaning notwithstanding the fact that the wear strips are closely spaced to adquately support the belt portion lying directly above the open casing top.

12 Claims, 3 Drawing Figures

BELT FILTER DEVICE WITH PIVOTAL SUCTION CASING

BACKGROUND OF THE INVENTION

1. Field of the Invention

The invention relates to a belt filter device comprising a frame, an endless conveyor belt guided along drums and at least one casing arranged below the upper run of the belt, in which subatmospheric pressure can be created for sucking fluid from material lying on the conveyor belt during operation through holes provided for this purpose in the conveyor belt, said casing being pivotable with respect to the frame between a first position suitable for operation in which a cover of the casing having at least one passage for the fluid is in contact with the underside of the upper run of the conveyor belt and a cleaning position in which the casing is turned downwards in a direction away from the upper run of the conveyor belt.

2. Description of the Prior Art

During operation fouling or crystallization of material or the like may occur in the casing so that it is necessary to clean the interior of the casing from time to time.

In the conventional constructions it is necessary, after the casing is moved into the cleaning position, to disengage the cover arranged on the casing and to remove the same in order to give free access to the interior of the casing. This is a time-consuming job, whilst the machine is put out of operation so that such periodic cleaning of the casing involves high costs.

SUMMARY OF THE INVENTION

The invention has for its object to provide a construction in which the disadvantages of the known constructions can be mitigated.

According to the invention this can be achieved in that the casing is pivotable with respect to the cover.

When using the construction embodying the invention it can be ensured that, when the casing is moved into the cleaning position, it is automatically disengaged from the cover so that no useful time gets lost by removing the cover from the casing.

In belt filters the covers of the vacuum casing are often provided with wear-resistant strips of synthetic resin, along which the belt will slide during operation. At the area of said wear-resistant strips wear occurs both of the conveyor belt and of the wear-resistant strips themselves.

According to the invention the cover can be formed by a few hollow profiles having flat top sides in contact with the underside of the upper run of the conveyor belt, whilst the profile walls have passages communicating with the interior of the profiles and opening out near the flat top sides, whilst lubricant is supplied through the hollow profiles.

At the area of the covers, which then need not be pivotable, an effective support and lubrication of the conveyor belt can in this way be obtained, whilst the special wear-resistant strips of synthetic resin or similar material can be omitted.

A further problem involved in belt filters comprising one or more vacuum casings resides in the fact that the fluid removed from the material lying on the belt together with air of the casing has to be evacuated to a separation tank, where air and fluid are separated. The air is conducted away with the aid of an exhaust pump and the fluid with the aid of a fluid pump. For each belt filter device several separation tanks are often required.

According to the invention an air outlet duct is connected with the casing near its top side and a fluid outlet duct is connected with the casing near its bottom side, whilst inside the casing a screen is arranged between the connection with the air outlet duct and the passage(s) in the cover.

By thus conducting the air and the fluid separately away from the casing no or at least fewer separation tanks are required so that not only the manufacturing cost of the device can be reduced but also the space occupied by the device is considerably smaller. Apart therefrom maintenance of the device will be cheaper since cleaning and maintaining of the separation tanks and of the associated appliances is no longer necessary.

The screen arranged in the casing prevents fluid droplets from being carried along through the air outlet duct.

The invention will be described more fully hereinafter with reference to embodiments of the construction according to the invention schematically shown in the accompanying drawings.

DESCRIPTION OF THE PREFERRED EMBODIMENTS

Figure 1:
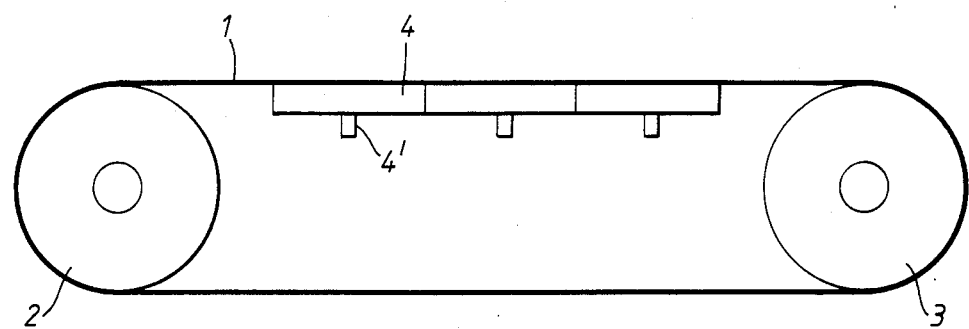
FIG. 1 is a schematic side elevation of part of a belt filter device embodying the invention.

As is schematically shown in FIG. 1 a belt filter device comprises an endless conveyor belt 1, which is guided around two drums 2 and 3. These drums 2 and 3 are rotatable about their center lines and supported in a frame (not shown in detail in FIG. 1), whilst means (not shown) are provided to rotate at least one of the drums during operation. During operation the endless conveyor belt 1 moves over a few casings 4 arranged below the upper run of the conveyor belt 1 and provided with connecting studs 4' for connecting each casing with a device for creating subatmospheric pressure in the casing concerned.

In the middle the belt has a plurality of holes through which fluid emanating from material lying on the belt 1 can be sucked in with the aid of the so-called vacuum casings 4.

Figure 2:
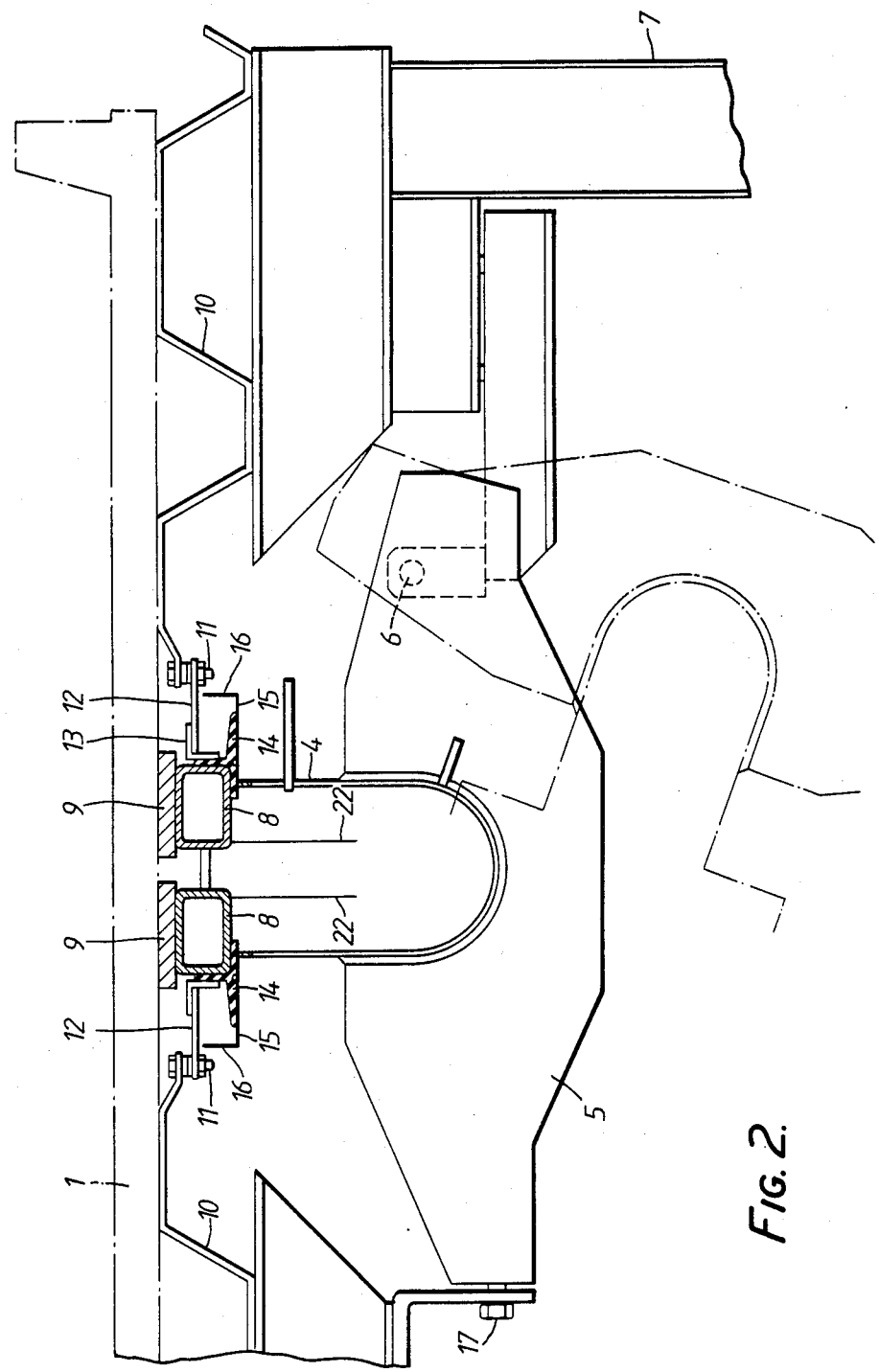
FIG. 2 is an enlarged, schematic cross-sectional view of part of a belt filter device embodying the invention.

FIG. 2 shows in further detail that a vacuum casing 4 is fastened to a carrier 5, which is pivotally coupled with the frame 7 of the device with the aid of a pivotal shaft 6, which extends horizontally and parallel to the direction of length of the belt 1 schematically shown in FIG. 2.

A cover formed by two relatively parallel and spaced hollow profile beams 8 is arranged on the top side of the vacuum casing. To these profile beams are fastened wear-resistant strips 9 of synthetic resin or suchlike material, which are also spaced apart by a given distance so that at the level of the medium longitudinal plane of the casing 4 a gap is formed. During operation the openings in the conveyor belt 1 for the evacuation of fluid from material lying on the conveyor belt 1 are moving opposite said gap.

From FIG. 2 it will furthermore be apparent that the parts of the upper run of the belt 1 located at the side of the casing 4, viewed in the direction of length of the conveyor belt 1, are supported by wave-shaped plates 10 arranged on the frame 7. On the proximal edges of these plates 10 arms 12 extending in the direction of the casing 4 are fastened with the aid of bolts 11. The ends of said arms are provided with angle-section profiles 13. Between the vertical limbs of the angle-section profiles 13 and the sidewalls extending parallel thereto and being remote from one another of the profile beams 8 forming the cover are clamped the vertical limbs of T-section sealing strips 14 of rubber or a similar, elastic material. With this structure the cover formed by the profile beam 8 is further supported through the arms 12 by the corrugated plates 10.

FIG. 2 furthermore shows schematically that at the top edges of the casing 4 flanges 15 extending horizontally in the working position have their outer ends 16 bent over upwardly at right angles. In the working position in which the end of the support 5 remote from the pivotal shaft 6 is fixed by one or more bolts 17 to the frame in the position shown in FIG. 2 by solid lines the flanges 15 are urged against the horizontal parts of the T-section sealing profiles 14 so that in the area of the junction between the cover 8 of the casing and the casing body itself a satisfactory seal is obtained.

During operation subatmospheric pressure can be generated in the casing 4 so that through the gap between the wear-resistant strips 9 and the profiles 8 and through the opposite holes in the upper run of the conveyor belt fluid can be extracted from the material lying on the belt.

For cleaning the interior of the casing 4 it is only necessary to loosen the bolt(s) 17, after which the casing 4 can be turned about the pivotal shaft 6. Owing to the support of the cover 8 described above the cover will remain in its place so that the interior of the casing is directly accessible for cleaning purposes after the turn into the cleaning position indicated by broken lines. After cleaning the casing can be turned back so that the horizontal parts of the strips 14 are again clamped tight between the cover and the flanges 15 of the casing to form a local seal.

Figure 3:
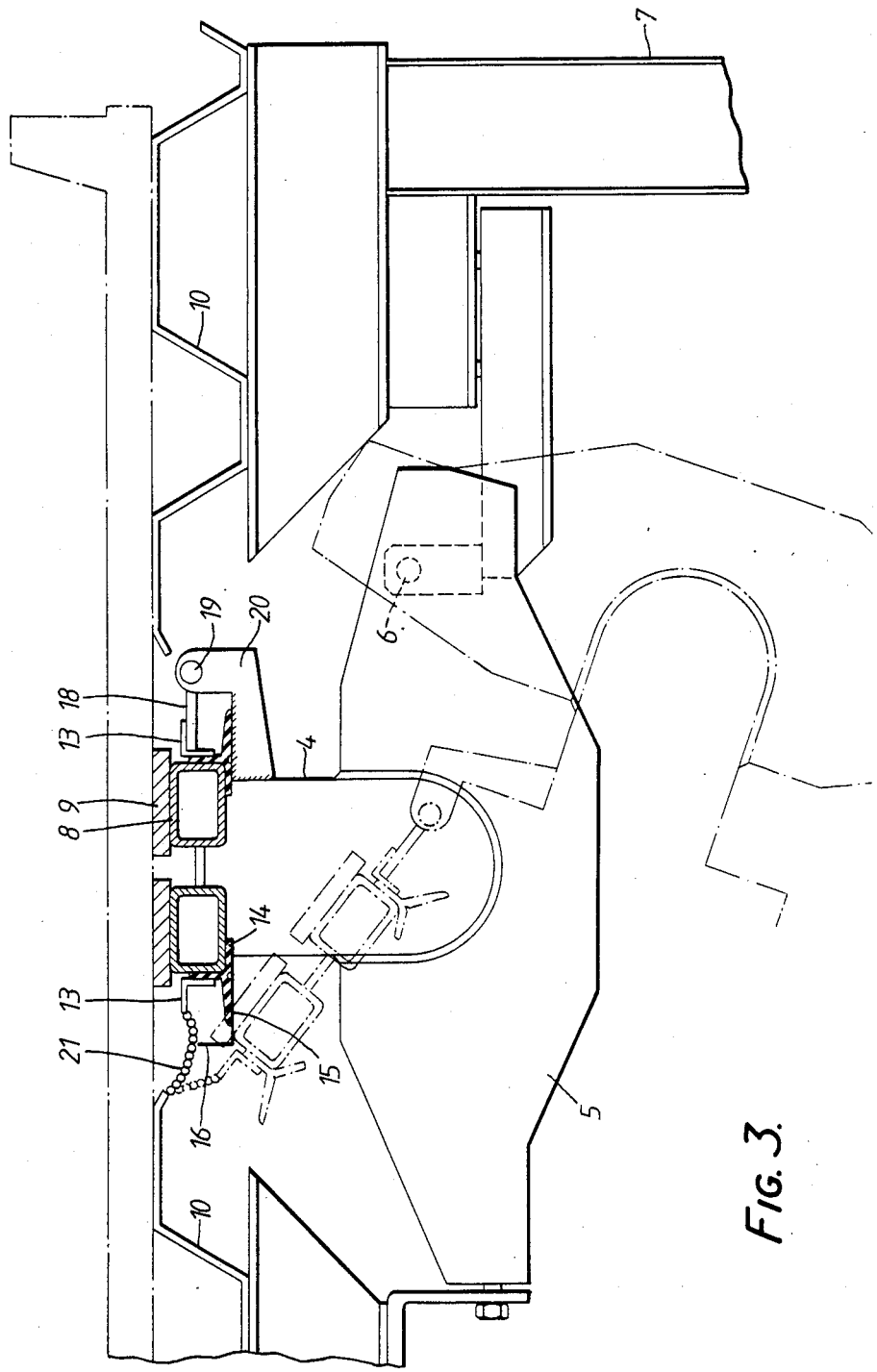
FIG. 3 is a sectional view like FIG. 2 of a further embodiment of the construction in accordance with the invention.

A different embodiment of the invention is schematically shown in FIG. 3. The parts corresponding with those described above are designated by the same reference numerals as in FIG. 2.

In the construction shown in FIG. 3 the cover formed by the profile beams 8 with the wear-resistant strips 9 fastened to said profiles and the angle-section irons 13 fastened to the cover and with the sealing strips 14 is not secured to the plates 10, but it is pivotally coupled with the aid of an arm 18 and a pivotal shaft 19 extending parallel to the pivotal shaft 6 with a support 20 fastened to the casing 4.

On the side of the cover remote from the pivotal shaft 19 the there located angle-section profile 13 has coupled with it the end of a chain 21, of a spring or of a similar flexible member, the other end of which is connected with the frame, in particular, with the neighboring plate 10.

When the casing 4 is turned open from the position indicated by solid lines in FIG. 3 to the position indicated by broken lines in FIG. 3 the pivotal shaft 19 and the part of the cover located near said pivotal shaft will also swing downwards, whereas the other end of the cover is retained by means of the chain 21 or the like so that the cover also gets free from the belt 1 and the interior of the casing becomes accessible. If desired, for example for maintenance or treatment of the cover, it can be turned further down after the chain 21 or the like is discoupled.

As stated above, it is common practice to provide a single evacuation duct for conducting away fluid and air from the vacuum casing.

According to the invention an air outlet duct (not shown in detail) can be connected with the top side of the casing, for example, on the left-hand top side of the casing, as viewed in FIG. 2 and a fluid outlet duct with the underside of the casing.

In order to prevent as much as possible suction of fluid particles through the air outlet duct, screens 22 schematically shown in FIG. 2 can be arranged in the casing 4 between the connection of the air outlet duct (not shown) and the fluid inlet opening located between the profiles 7 and 8. The fluid droplets along said screens are guided towards the underside of the casing 4 so that the risk of suction of fluid droplets through a duct connected on the top end of the casing on the left-hand or right side is negligible. By using the casing 4 not only for sucking fluid out of the material lying on the belt but also as a member for separating air from fluid, special separation tanks for such a separation can be disensed with.

According to a further aspect of the invention the special wear-resistant strips 9 may be dispensed with and the belt can be directly supported by the flat top sides of the hollow beams 8 forming the cover, when the top walls of the profiles are provided with passages opening out near the flat top sides of said profiles supporting the conveyor belt. Through the profiles pressurized lubricant can be supplied for obtaining lubrication between the cover and the part of the conveyor belt 1 supported by the cover.

As a matter of course, within the spirit and scope of the invention additions and/or modifications of the embodiments described above and illustrated in the Figures are conceivable.

For example, the cover may consist of two separate cover parts lying one on each side of the gap in the cover, which parts may be integral parts of the frame part supporting the upper run of the belt 1.

A further aspect of the invention is that it is possible to provide in the interior of the vacuum casing a loose lining of rubber or the like material which can be fixed on the upper edges of the casing.

When there occurs a substantial fouling in the casing, e.g. due to crystallization, whereby there adheres dirt or crystals on the walls of the casing, the casing can be pivoted in a downward direction. Thereafter the lining can be drawn or blown inside out whilst the edges remain in position. Due to the deformation of the rubber or the like which occurs the dirt or crystals will be loosened.

I claim:
1. In combination:
a frame;
drum means rotatably mounted on said frame;
an endless conveyor belt guided for movement by said drum means and having means defining holes for the drainage of liquids from material lying on the belt;
casing means normally disposed in an operational position beneath a portion of said belt and having an upper top with means defining an opening nor- mally facing the underside of said portion of said belt for receiving liquids from said belt;

means for supporting the underside of said portion of said belt above said open top of said casing means when said casing means is in said operational position, said supporting means including a pair of wear resistant means normally in contact with said belt and means defining a gap therebetween, said gap between said wear resistant means being substantially smaller in directions transverse to the path of movement of said belt than a parallel dimension of the opening of said top of said casing means when the latter is in its operational position, for providing support to said portion of said belt in areas directly above said open top of said casing means;

means pivotally mounting said casing means to said frame for swinging movement of the casing means away from said operational position and toward a position for cleaning; and means for separating said casing means from said supporting means simultaneously with movement of said casing means from its operational position toward its position for cleaning, said separating means being operable to facilitate access into interior regions of said casing means through said relatively large dimensioned opening of said top when said casing means is in its position for cleaning notwithstanding the fact that said belt portion is closely supported across said gap by said supporting means in areas directly above said open top of said casing means when said casing means is in its operational position.

2. A belt filter device as set forth in claim 1, wherein said supporting means has two sides and is pivotally coupled near one side with the casing means and is coupled with the frame near the other side with a flexible connecting member.

3. A belt filter device as set forth in claim 2, including means for decoupling the flexible connecting member from the frame.

4. A belt filter device as set forth in claim 1, wherein said wear resistant means of said supporting means comprises hollow profiles having flat top sides engaging the underside of the upper run of the conveyor belt, the profile walls having means defining passages communicating with the interior of the profiles opening out near the flat top sides, for providing lubricant through the hollow profiles and to said flat top sides in contact with said belt.

5. A belt filter device as set forth in claim 1, including an air outlet duct connected near the upper side of the casing means; a liquid outlet near a lower side of the casing means; and a screen arranged inside the casing means and between the junction of the air outlet duct and the gap between the wear resistant means.

6. A belt filter device as as set forth in claim 1 wherein the casing means is provided with a loose lining against the wall of the casing means.

7. A belt filter device according claim 6 wherein the lining is fixed to upper edges of the casing means.

8. A belt filter device as set forth in claim 6; including means for blowing air between the wall of the casing means and the lining.

9. The belt filter device as set forth in claim 1, wherein said separating means includes means for retaining said supporting means in a fixed position below said portion of said belt when said casing means moves toward its position for cleaning.

10. The belt filter device as set forth in claim 1, wherein said separating means includes means for swinging said supporting means away from said portion of said belt as said casing means moves toward its position for cleaning.

11. The belt filter device as set forth in claim 1, including sealing strips disposed between said casing means and said supporting means when said casing means is in its operational position for substantially precluding leakage of fluid between said casing means and said supporting means.

12. A belt filter device as set forth in claim 11 wherein the sealing strips have a cross-section presenting two limbs, one limb of which is clamped to a side of the supporting means, whereas the other limb extending on both sides of said clamped limb in a horizontal direction is clamped partly between the underside of the supporting means and a flange of the casing means, whilst the remaining part is in contact with the flange of the casing means.

* * * * *